E. E. ENGLUND.
LAND MARKER FOR PLANTERS.
APPLICATION FILED NOV. 6, 1916.
1,228,764.
Patented June 5, 1917.
2 SHEETS—SHEET 1.
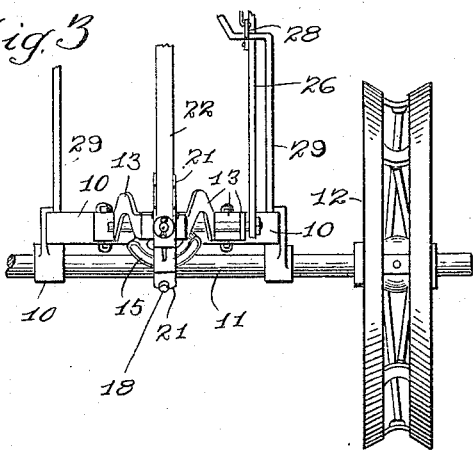
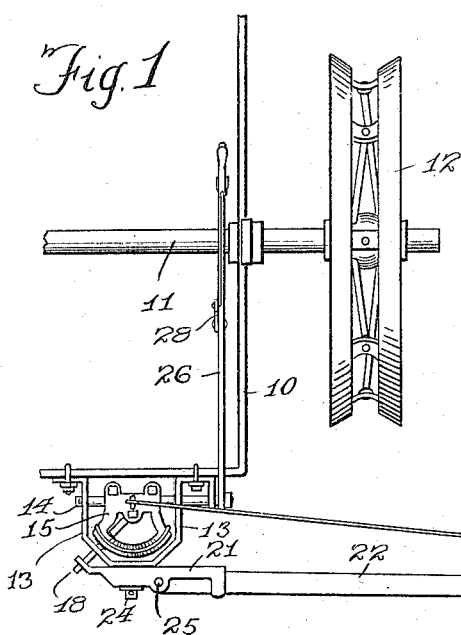
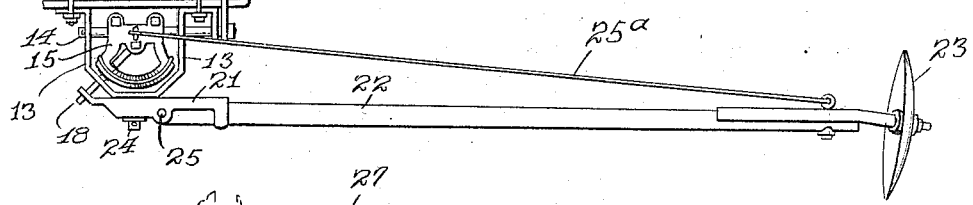
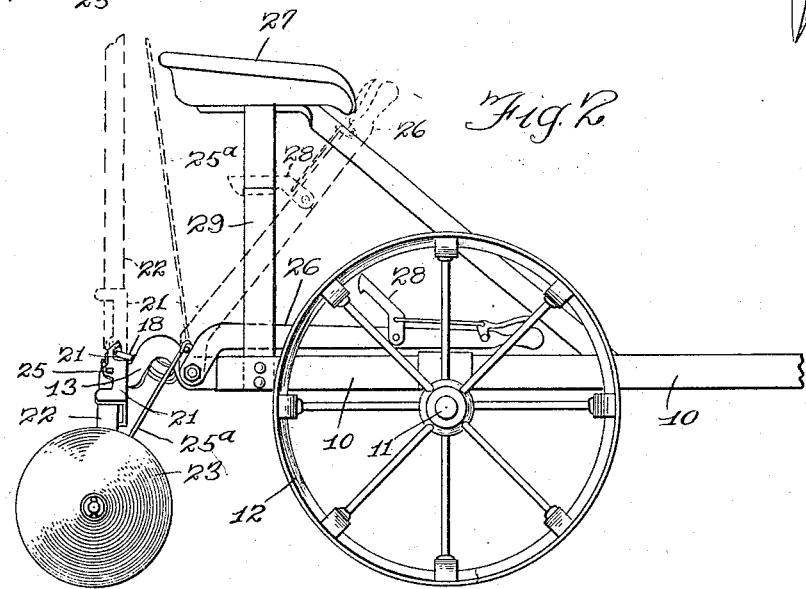

E. E. ENGLUND.
LAND MARKER FOR PLANTERS.
APPLICATION FILED NOV. 6, 1916.
1,228,764.
Patented June 5, 1917.
2 SHEETS—SHEET 2.
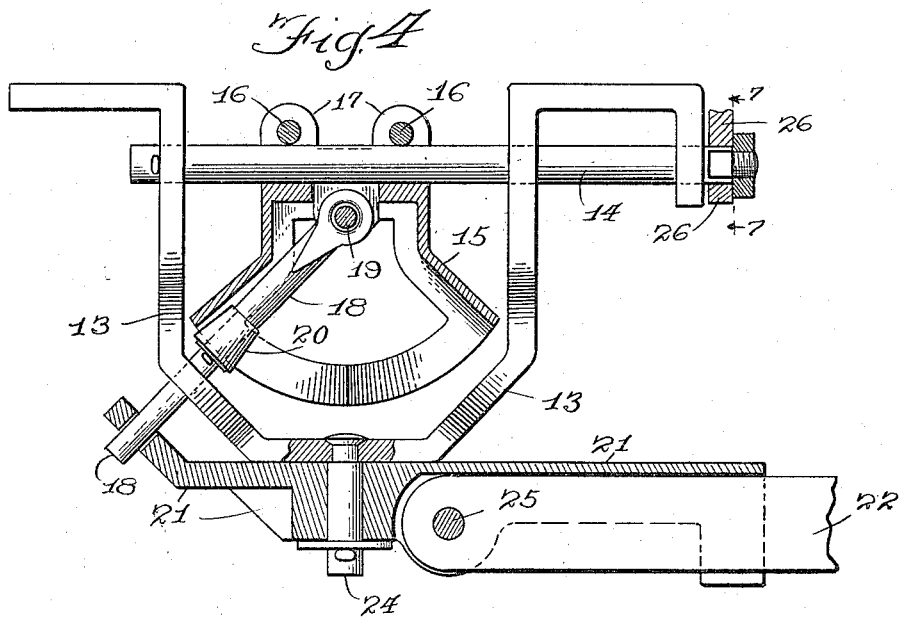
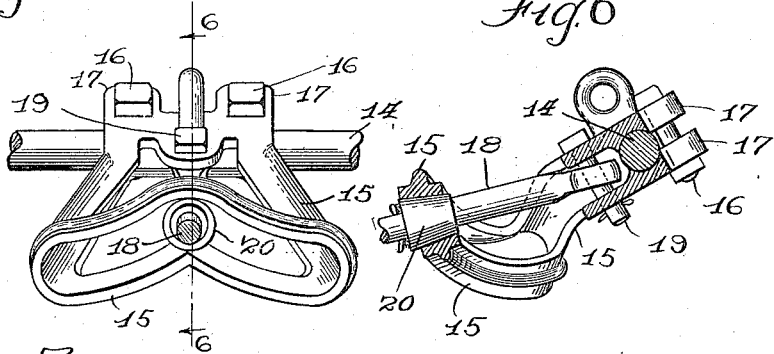
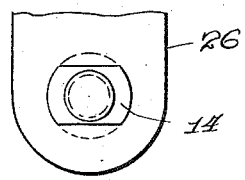
Witness:
L. B. Graham
Inventor:
Ernst E. Englund.
By Adams & Jackson,
Att'ys.

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

LAND-MARKER FOR PLANTERS.

1,228,764.     Specification of Letters Patent.     Patented June 5, 1917.

Application filed November 6, 1916. Serial No. 129,874.

*To all whom it may concern:*

Be it known that I, ERNST E. ENGLUND, a citizen of the United States, and a resident of Moline, in the county of Rock Island and State of Illinois, have invented certain new and useful Improvements in Land-Markers for Planters, of which the following is a specification, reference being had to the accompanying drawings.

This invention relates to an improved land-marking device adapted to be attached to a planter for marking the earth at one side of and parallel to the line of travel of the planter in order that the mark so made may serve as a guide for the machine on its next trip across the field. It relates to that type of marker comprising a pivoted bar that can be turned to project laterally from either side of the planter. The object of the invention is to provide a simple mechanism by which the driver, from his seat on the machine, can easily and quickly move the said pivoted marker-bar to either of its operative positions, or can move it to a vertical and inoperative position and when so turned up into inoperative position have it firmly held. Such object I attain by the means shown in the drawings and hereinafter specifically described. That which I believe to be new will be pointed out in the claims.

In the drawings,—

Figure 1 is a plan view of a portion of a planter with my improved land-marking device attached thereto and in operative position;

Fig. 2 is a side elevation of the parts as shown in Fig. 1, and showing also, in dotted lines, the position of the parts when the bar carrying the marking device is elevated to and locked in vertical position, as, for example, when the machine is turning at the end of a field or is being moved to or from a field;

Fig. 3 is a rear elevation, showing the marker-bar in its raised or inoperative position;

Fig. 4 is an enlarged detail, being a view partly in plan and partly in horizontal section of the improved means for securing the marking device to a planter frame;

Fig. 5 is a rear view of the hollow arm with which the marker-bar is connected through the medium of a link;

Fig. 6 is a vertical section on the line 6—6 of Fig. 5; and

Fig. 7 is a detail, being a section at line 7—7 of Fig. 4.

In the several figures of the drawings, in which corresponding parts are indicated by like reference characters,—

10 indicates a portion of an ordinary rear frame of a corn-planter, 11 the axle and 12 one of the carrying and covering wheels. 13 indicates a bracket, preferably formed of a single piece of metal bent to form two similar side members spaced a distance apart, an end wall at the rear with which the marker-bar is pivotally connected as hereinafter described, and suitably turned end members at the front portion for rigid attachment to the rear bar of a planter-frame. 14 indicates a rock-shaft journaled in the bracket 13 near the forward part of such bracket. 15 indicates a wide and hollow arm located between the side members of the bracket 13 and rigidly clamped upon the said rock-shaft. As shown, it is so secured by bolts 16, each of which passes through an upper and lower ear 17 at the forward end of the arm where such arm partially embraces the rock-shaft, as shown in Fig. 6. Any other appropriate means for rigidly securing the arm 13 to the rock-shaft could, of course, be employed. 18 indicates a link connected at its forward end to the forward part of the said arm, such link being located within the arm and projecting from the open rear end thereof. In the construction shown, such connection of the link to the arm is by a pin or bolt 19 passing through the upper and lower walls of the hollow arm and through a comparatively large opening in the forward end of the link, as clearly shown in the sectional view, Fig. 6. The link is thus pivoted in place but with sufficient looseness to permit its outer end an up-and-down movement also.

The upper and lower walls of the hollow arm are so formed as to present at the rear end a wide mouth through which the loosely-pivoted link 18 projects. These walls at said rear mouth portion form a track or guide for the said link, and to render its movement thereon more easy an anti-friction roller 20 is journaled upon the link. The track is so curved as to form a welldefined central recess in the upper member thereof and a correspondingly-raised central projection on the lower member, in which central recess the roller 20 rests when the marker-bar is in vertical position and is held securely therein by the locking of the rock-shaft against rotation, as hereinafter described, aided also by the central projection referred to. The track at each side of the central recess is given a cam shape, as clearly shown in Fig. 5, and the object of which is fully set forth hereinafter in connection with the description of the operation of the device.

21 indicates a holder, best formed by casting, and channel-shaped to adapt it to receive one end of a long bar 22 that has secured to its outer end in any suitable manner an earth-marking device 23, such device being here shown as a revolubly-mounted disk. The holder 21 is pivotally mounted upon a pin 24 secured in the rear end wall of the bracket 13, and the bar 22 is shown as secured to such holder by a bolt 25 secured in the opposite walls of the holder. The shorter end of the holder is turned as shown, and through an opening in such turned end projects the outer end of the link 18. 25a indicates a brace-rod loosely connected, as by interlocking eyes, with the hollow arm 15 and the outer portion of the marker-arm 22.

26 indicates a hand-lever fitting on a squared end portion of the rock-shaft 14, such lever being within convenient reach of the driver on the seat 27. This hand-lever carries a pivoted latch 28, adapted to engage the seat-support 29 when the lever is pulled back and by such engagement lock it and the rock-shaft against movement. The lever is provided with any usual finger-piece and connection from it to the latch to permit the unlocking of the lever when the driver desires to move the rock-shaft.

In operation, with the marker in operative position as shown in Fig. 1, when the driver wishes to raise the marker, as for instance when the machine is to be turned around or is to be moved to or from a field, he will pull up on the hand-lever 26 and cause its latch 28 to engage the seat-support, as shown by dotted lines in Fig. 2. This movement of the lever, of course, causes a turning of the rock-shaft and a downward swing of the arm 15 that is clamped to it. The link 18 also moves down, of course, and because it projects through the hole in the turned portion of the shorter end thereof it will cause the holder to turn on its pivot 24, thus raising the marker-bar. During such movement the link will move from the side toward the center of the hollow arm, the roller 20 bearing on the curved or cam-shaped track at the open rear end of such arm. As such link is brought to the center of the arm (as in Fig. 5), the roller is directed into the central recess of one of the track members by the complementary-shaped central portion of the other track member. As the connecting link reaches this central position, the hand-lever 26 has been brought back to the limit of its upward movement and locked in place as hereinbefore described, and as such locking of the lever in place also locks the rock-shaft against turning, the hollow arm that is clamped to the shaft is held rigidly in place. Being thus held it will, of course, be impossible for the link 18 to move laterally, as it is evident that without a movement of the arm the roller 20 on the link cannot move out of the central recess or depression that is formed in one of the track members at the outer end of the arm. The raised central portion of the lower track member aids in holding the bar rigidly in the vertical position as it compensates for any looseness of fit of the parts which might otherwise permit more or less of a wabbling motion of the bar. The result of the locking of the parts as described is that the marker-bar is held very securely in a substantially vertical position. When it is desired to again put the marker in operative position, the hand-lever 26 is unlocked and turned down, causing a forward rocking of the shaft 14 and an upward movement of the arm 15 and the link 18 loosely pivoted to the arm, and necessarily causing a turning of the marker-bar support on its pivot 24,—the link during such operation moving toward one side of the arm and coming to rest, when the marker-device is on the ground, at or very close to the closed end of the described track at the end of the arm 15. When releasing the controlling lever from locked position preparatory to lowering the marker-bar, the operator will reach around and give the said bar a slight push to direct it toward that side at which the work of the marker is to be done. After such initial movement is so given to the bar, its descent is wholly under the control of the driver, as will be understood from the description of the parts already given. Being under control during the lowering operation, the liability of damaging any of the parts is greatly decreased.

By giving to the track between the said central recess and each of the ends a compound curve or cam face, such as shown, for the roller 20 to engage, I have found that the leverage required to move the marker-bar from an inclined position of 45 degrees to a complete vertical position is not materially greater than that required to move it from a horizontal position to such inclined position, notwithstanding the fact that the link 18 during the last half of its movement approaches more and more a position at right angles to the rock-shaft and consequently more nearly in vertical alinement with the pivot of the marker-bar,—which position would ordinarily tend, of course, to make the last half of the lifting movement more difficult than the first half.

When in working position, the marker-bar can rise and fall to conform to inequalities in the ground, the marker-bar and its support 21 turning freely on the pivot 24 to permit of this. The side members of the supporting bracket 13 are curved, as best shown in Fig. 2, so that the link 18 will not come in contact with the under edges of these side members when the marker 23 drops into a moderate sized depression or rut.

That which I claim as my invention, and desire to secure by Letters Patent, is,—

1. In a device of the class described, the combination with a planter-frame, of a laterally-swinging pivoted bar carrying a marking device at its outer end, a rock-shaft arranged transversely of the machine, means connecting said rock-shaft and bar to cause a turning of the bar when said shaft is rocked, an operating lever secured to the shaft and adapted to be locked in place when the marker-bar is elevated, and other means for assisting in holding said marker-bar elevated.

2. In a device of the class described, the combination with a planter-frame, of a laterally-swinging pivoted bar carrying a marking device at its outer end, a rock-shaft arranged transversely of the machine, a link pivotally connected with said rock-shaft and said bar, an operating lever secured to the shaft and adapted to be locked in place when the marker-bar is elevated, and means for engaging said link to hold it against lateral movement when the marker-bar is in vertical position.

3. In a device of the class described, the combination with a planter-frame, of a rock-shaft arranged transversely of the machine, an arm rigidly mounted on said rock-shaft, a laterally-swinging pivoted bar carrying a marking device at its outer end, a link pivotally connected with said arm and bar, said arm having a recess in rear of the pivotal point of attachment of the link to the arm, said recess being adapted to receive the link when the marker-bar is elevated, means for operating said rock-shaft, and means for locking said shaft and the arm carried thereby when said link is in said recess.

4. In a device of the class described, the combination with a planter-frame, of a rock-shaft arranged transversely of the machine, an arm rigidly mounted on said rock-shaft, a laterally-swinging pivoted bar carrying a marking device at its outer end and adapted to be swung out at either side of the machine, a link pivotally connected with said arm and bar at a point near the forward end of the arm, said arm having a central recess in its rear portion in that face opposite which the link is located, means for operating said rock-shaft, and means for locking said link in said recess.

5. In a device of the class described, the combination with a planter-frame, of a rock-shaft arranged transversely of the machine, an arm rigidly mounted on said rock-shaft, a laterally-swinging pivoted bar carrying a marking device at its outer end, a link pivotally connected with said arm and bar and movable transversely of said arm, an anti-friction roller mounted on said link, said arm having a recess adapted to receive such roller when the marker-bar is elevated, means for operating said rock-shaft, and means for locking said shaft and the arm carried thereby when said roller on the link is moved into said recess.

6. In a device of the class described, the combination with a planter-frame, of a rock-shaft arranged transversely of the machine, a hollow arm rigidly connected to said rock-shaft, a laterally-swinging pivoted bar carrying a marking device at its outer end and adapted to be swung out at either side of the machine, a link pivoted at one end in said hollow arm and at its other end pivotally connected with said bar, the upper and lower walls of the opening in the outer end of the arm and through which said links project being curved and adapted to hold said link at the central portion thereof when the marker arm is elevated, means for operating said rock-shaft, and means for locking it and the said arm against movement.

7. In a device of the class described, the combination with a planter frame, of a bracket attached to the rear of such frame, a rock-shaft journaled in the bracket and extending transversely of the machine, an arm rigidly fastened to said shaft, a laterally-swinging pivoted bar carrying a marking device at its end, a link pivotally connected at its forward end to said arm adjacent the forward end of said arm and at its rear end pivotally connected with said bar, said link being movable laterally of the arm during the swinging movement of the arm and said arm having means near its rear end for engaging said link to hold it against movement when the said bar is elevated, and means for operating said rock-shaft.

8. In a device of the class described, the combination with a planter-frame, of a rock-shaft arranged transversely of the machine, an arm rigidly mounted on said rock-shaft, a laterally-swinging pivoted bar carrying a marking device at its outer end, a link pivotally connected with said arm and bar, said arm having a recess to receive the link when the marker-bar is elevated and a cam-shaped guiding surface coacting with the link during the movement of the marker-arm, and means for turning said rock-shaft.

9. In a device of the class described, the combination with a planter-frame, of a rock-shaft arranged transversely of the machine, an arm rigidly mounted on said rock-shaft, a laterally-swinging pivoted bar carrying a marking device at its outer end, a link pivotally connected with said arm and bar, said arm having a recess to receive the link when the marker-bar is elevated and a cam-shaped guiding surface at each side of said recess each adapted to coact with the link, and means for turning said rock-shaft.

10. In a device of the class described, the combination with a planter-frame, of a rock-shaft arranged transversely of the machine, an arm rigidly mounted on said rock-shaft, a laterally-swinging pivoted bar carrying a marking device at its outer end, a link pivotally connected with said arm near the forward end of such arm and movable laterally thereof and in engagement therewith and pivotally connected at its rear end with said marker-bar, said arm being provided at its rear end with means for engaging said link to hold it against sidewise movement when the marker-bar is in elevated position, and means for rocking said shaft.

11. In a device of the class described, the combination with a planter-frame, of a rock-shaft arranged transversely of the machine, an arm rigidly mounted on said rock-shaft, a laterally-swinging pivoted bar carrying a marking device at its outer end, a pivoted link movable laterally of said arm and held in engagement therewith and connected with said marker-bar, said arm having a cam-shaped guiding surface coacting with the link during the movement of the marker-arm and having means for retaining said link against movement when the marker-bar is elevated, and means for rocking said shaft and the arm carried thereby.

12. In a device of the class described, the combination with a planter-frame, of a rock-shaft arranged transversely of the machine, a hollow arm rigidly connected to said rock-shaft, a laterally-swinging pivoted bar carrying a marking device at its outer end, a pivoted link in said arm and projecting therefrom and connected with said marker-bar, said arm having a cam-shaped guiding surface coacting with the link during the movement of the marker-bar and having means for retaining said link against movement when the marker-bar is elevated, and means for rocking said shaft and the arm carried thereby.

13. In a device of the class described, the combination with a planter-frame, of a rock-shaft arranged transversely of the machine, a hollow arm rigidly connected with said rock-shaft, a laterally-swinging pivoted bar carrying a marking device at its outer end and adapted to be swung out at either side of the machine, a pivoted link within said hollow arm and projecting from the open rear end thereof and connected with said marker-bar, said arm having means at its rear central portion for retaining said link when the marker-bar is in elevated position and having at each side of such center a cam-shaped guiding surface with which said link engages during the movement of the marker-bar, and means for rocking the shaft and the arm carried thereby.

ERNST E. ENGLUND.

Copies of this patent may be obtained for five cents each, by addressing the "Commissioner of Patents, Washington, D. C."